US012704001B2

(12) United States Patent
Donahue et al.

(10) Patent No.: US 12,704,001 B2
(45) Date of Patent: Aug. 11, 2026

(54) VAULT DOOR

(71) Applicant: AOB Products Company, Columbia, MO (US)

(72) Inventors: Ryan Donahue, Columbia, MO (US); Michael Cottrell, Ashland, MO (US); James Tayon, Moberly, MO (US); Brian Steere, Columbia, MO (US); Fernando Coviello, Columbia, MO (US)

(73) Assignee: AOB Products Company, Columbia, MO (US)

( * ) Notice: Subject to any disclaimer, the term of this patent is extended or adjusted under 35 U.S.C. 154(b) by 9 days.

(21) Appl. No.: 17/444,345

(22) Filed: Aug. 3, 2021

(65) Prior Publication Data

US 2022/0235583 A1 Jul. 28, 2022

Related U.S. Application Data

(60) Provisional application No. 63/060,482, filed on Aug. 3, 2020.

(51) Int. Cl.

*E05B 65/00* (2006.01)
*E05B 47/00* (2006.01)
*E05G 1/04* (2006.01)

(52) U.S. Cl.

CPC ...... *E05B 65/0078* (2013.01); *E05B 47/0012* (2013.01); *E05G 1/04* (2013.01);
(Continued)

(58) Field of Classification Search

CPC .... E05B 47/0012; E05B 47/02; E05B 47/026; E05B 5/00; E05B 5/003; E05B 5/006;
(Continued)

(56) References Cited

U.S. PATENT DOCUMENTS 2,094,369 A * 9/1937 Millice ............... E05B 65/0078 70/465
2,879,725 A 3/1959 Zuver
(Continued)

FOREIGN PATENT DOCUMENTS

CN 109723279 A * 5/2019
CN 111075276 A * 4/2020 ............ E05B 15/00
(Continued)

OTHER PUBLICATIONS

Machine translation of DE 3412136 A1 (Year: 1985).*
(Continued)

*Primary Examiner* — Christine M Mills
*Assistant Examiner* — Peter H Watson
(74) *Attorney, Agent, or Firm* — Stinson LLP

(57) ABSTRACT

A vault door system for use in a vault includes a door supporting a plurality of locking bolts that move between locked and unlocked positions. A drive system includes a prime mover and a drive train. The prime mover actuates the drive train to move the locking bolts between the locked and unlocked positions. An inner handle is at an inner side of the door and is arranged to be accessible from an interior of the vault. The inner handle is operatively coupled to the drive train and is movable between a first position and a second position. In the first position, the drive train operatively couples the prime mover to the plurality of locking bolts so that the prime mover can move the locking bolts between the locked and unlocked positions. In the second position, the drive train does not operatively couple the prime mover to the plurality of locking bolts.

44 Claims, 9 Drawing Sheets

(52) U.S. Cl.
CPC . *E05B 2047/0017* (2013.01); *E05B 2047/002* (2013.01); *E05B 2047/0086* (2013.01)

(58) Field of Classification Search
CPC ............. E05B 63/0069; E05B 65/0075; E05B 65/0078; E05G 1/04
See application file for complete search history.

(56) References Cited

U.S. PATENT DOCUMENTS

| | | | | | |
|---|---|---|---|---|---|
| 3,735,714 | A | | 5/1973 | Shoop | |
| 3,762,787 | A | * | 10/1973 | Grubb | E05G 1/024 312/409 |
| 4,184,349 | A | | 1/1980 | Zaks | |
| 4,232,613 | A | | 11/1980 | Kempf | |
| 4,422,386 | A | * | 12/1983 | Carpenter | E05B 35/00 292/336.5 |
| 4,470,277 | A | | 9/1984 | Jyeda | |
| 4,870,909 | A | | 10/1989 | Richter | |
| 4,917,022 | A | | 4/1990 | Ogasawara et al. | |
| 5,067,755 | A | | 11/1991 | James | |
| 5,094,483 | A | | 3/1992 | James | |
| 5,245,846 | A | * | 9/1993 | James | E05B 65/0078 109/59 R |
| 5,339,663 | A | * | 8/1994 | Doring | E05B 63/0069 70/379 R |
| 5,341,752 | A | | 8/1994 | Hambleton | |
| 5,778,708 | A | | 7/1998 | Crosby et al. | |
| 5,961,194 | A | * | 10/1999 | Shaw | H05K 5/023 312/352 |
| 6,000,348 | A | | 12/1999 | Do | |
| 6,095,573 | A | | 8/2000 | Rozema | |
| 6,293,207 | B1 | | 9/2001 | Do | |
| 7,100,406 | B2 | | 9/2006 | Masseth, Jr. | |
| 7,591,157 | B2 | | 9/2009 | O'Neill et al. | |
| 8,276,527 | B2 | | 10/2012 | Stepp | |
| 8,347,665 | B2 | | 1/2013 | Rasmussen et al. | |
| 8,479,543 | B2 | | 7/2013 | Yang et al. | |
| 9,410,355 | B2 | | 8/2016 | Suggs et al. | |
| 10,316,545 | B2 | * | 6/2019 | Pirnar | E05B 5/003 |
| 2005/0193932 | A1 | | 9/2005 | Denison et al. | |
| 2011/0066288 | A1 | * | 3/2011 | Sparenberg | F16P 7/00 292/144 |
| 2019/0360259 | A1 | | 11/2019 | Green et al. | |

FOREIGN PATENT DOCUMENTS

| | | | | | |
|---|---|---|---|---|---|
| DE | 3412136 | A1 | * | 10/1985 | E05B 47/0012 |
| KR | 100481554 | B1 | * | 4/2005 | E05B 15/00 |
| KR | 102122711 | B1 | * | 6/2020 | E05B 1/0038 |
| WO | WO-2013175514 | A1 | * | 11/2013 | E05B 47/0012 |

OTHER PUBLICATIONS

Machine translation KR 102122711 B1 (Year: 2020).*
Machine translationKR 100481554 B1 (Year: 2005).*
Annotated Machine translation of CN-109723279-A (Year: 2019).*

* cited by examiner

VAULT DOOR

CROSS-REFERENCE TO RELATED APPLICATION

This application claims priority to U.S. Provisional Application No. 63/060,482, filed Aug. 3, 2020, the entirety of which is hereby incorporated by reference.

FIELD

The present disclosure generally relates to a safe or vault door and more particularly to systems for locking and unlocking a safe or vault door.

BACKGROUND

Vaults and safes are used in a variety of different applications to provide protection and safekeeping of valuable items. Vaults and safes come in a wide variety of sizes such as standalone cabinets to entire rooms within a building, such as a bank.

SUMMARY

In one aspect, a vault door system for use in a vault comprises a door having opposite interior and exterior sides. The interior side is arranged to face an interior of the vault. A plurality of locking bolts are supported by the door. The locking bolts are movable between a locked position and an unlocked position. In the locked position, the locking bolts protrude from the door so that the locking bolts are positioned to engage a frame of the vault to lock the door in a closed position. In the unlocked position, the locking bolts are retracted relative to the locked position so that the locking bolts are positioned to disengage the frame to permit the door to be moved to an open position. A drive system includes a prime mover and a drive train. The prime mover is configured to actuate the drive train to move the locking bolts between the locked and unlocked positions. An inner handle is at the inner side of the door and is arranged to be accessible from the interior of the vault. The inner handle is operatively coupled to the drive train and is movable between a first position and a second position. In the first position, the drive train operatively couples the prime mover to the plurality of locking bolts so that the prime mover can move the locking bolts between the locked and unlocked positions. In the second position, the drive train does not operatively couple the prime mover to the plurality of locking bolts.

In another aspect, a vault door system for use with a vault comprises a door having opposite interior and exterior sides. The interior side is arranged to face an interior of the vault. The exterior side includes an exterior surface arranged to face away from the interior of the vault. A plurality of locking bolts are supported by the door. The locking bolts are movable between a locked position and an unlocked position. In the locked position, the locking bolts protrude from the door so that the locking bolts are positioned to engage a frame of the vault to lock the door in a closed position. In the unlocked position, the locking bolts are retracted relative to the locked position so that the locking bolts are positioned to disengage the frame to permit the door to be moved to an open position. A drive system includes a prime mover and a drive train operatively coupling the prime mover to the locking bolts. The prime mover is configured to actuate the drive train to move the locking bolts between the locked and unlocked positions. An outer handle is supported by the door. The drive train operatively couples the prime mover to the outer handle. The outer handle is movable between a retracted position and an extended position. In the retracted position, the outer handle is arranged with respect to the door to obstruct a user from gripping the outer handle to move the door via the outer handle. In the extended position, the outer handle protrudes outward of the exterior surface of the door such that the outer handle can be grabbed by a user. The prime mover is configured to move the outer handle toward the extended position.

Other objects and features of the present disclosure will be in part apparent and in part pointed out herein.

BRIEF DESCRIPTION OF THE DRAWINGS

Corresponding reference characters indicate corresponding parts throughout the drawings.

Figure 1:
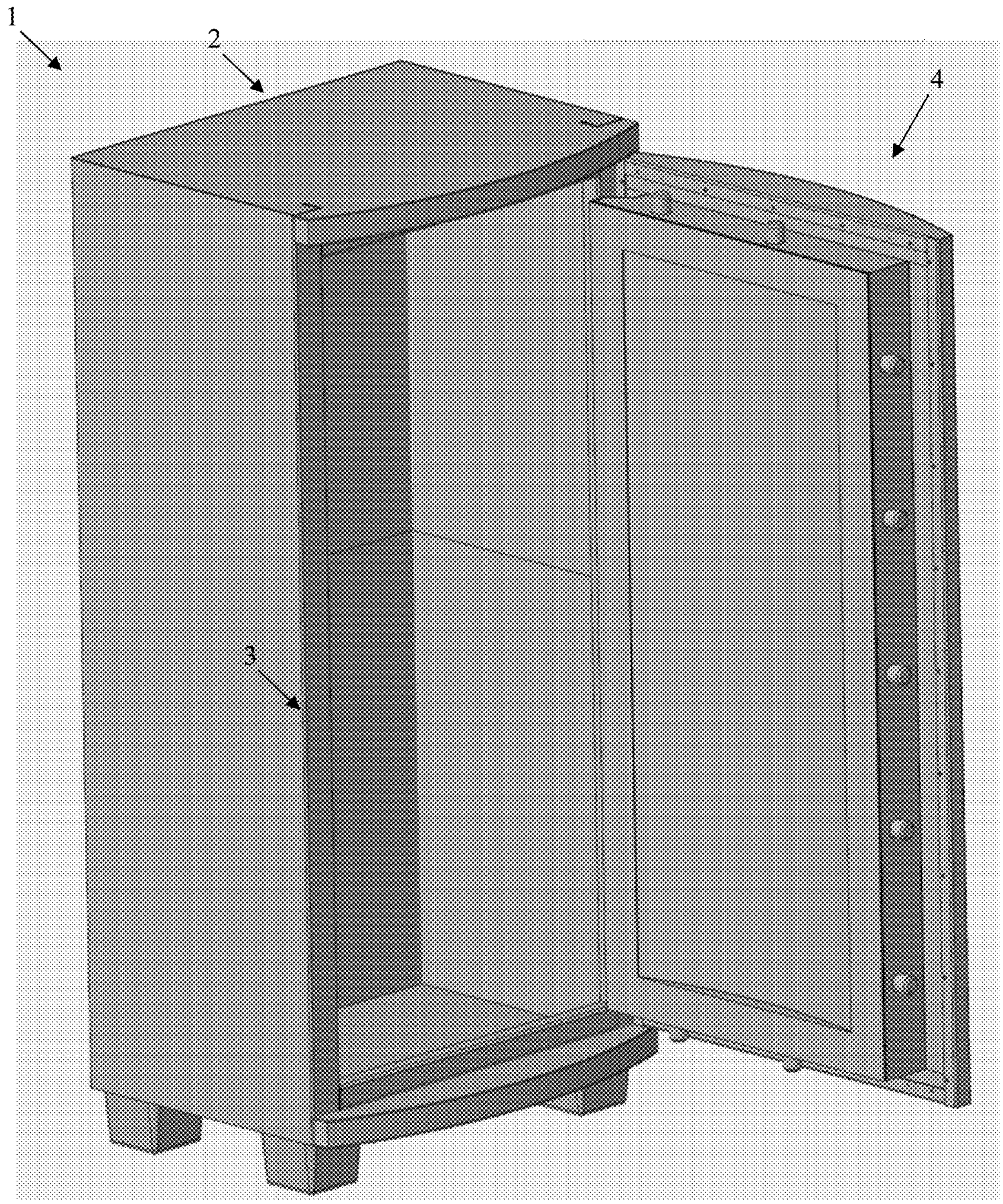
FIG. 1 is a perspective of a vault.

In the drawings, broken lead lines for reference numerals designate a component that is generally behind a transparent component.

DETAILED DESCRIPTION

Referring to FIG. 1, a cabinet-style safe or vault 1 includes a vault body 2 defining an interior in which one or more objects (e.g., valuables, etc.) may be stored. The vault body 2 has a door frame 3 that defines an opening a door system 4 of the vault selectively closes. The door system 4 has an outer side that obstructs intruders or unauthorized persons from entering the interior of the vault 1. The outer side of the door system 4 can include a user interface for unlocking the door system, such as with a code. The door system 4 has an inner side opposite the outer side that faces the interior protected by the door. It will be appreciated that the vault 1 can include features described in more detail below with respect to vault door system embodiments.

Figure 2:
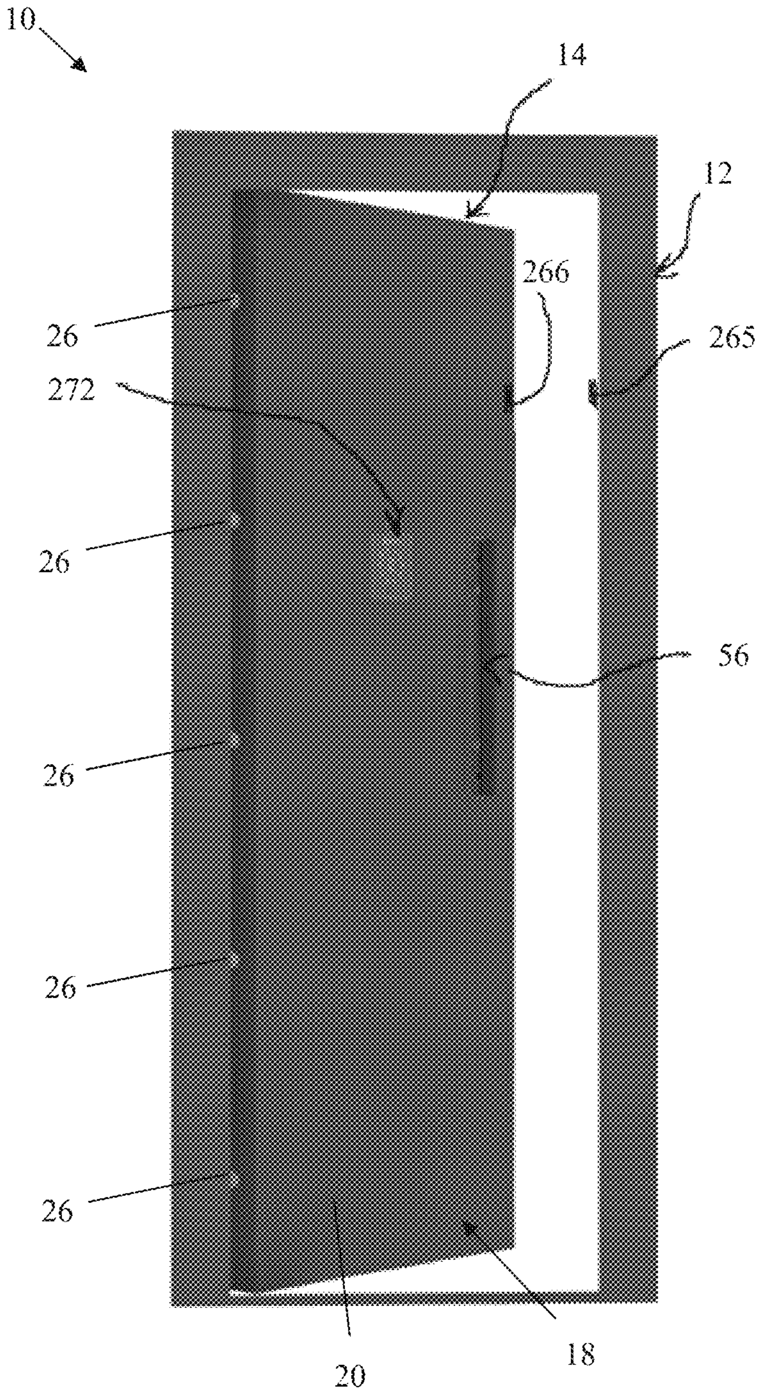
FIG. 2 is a front view of a vault door system according to one embodiment of the present disclosure.
Figure 3:
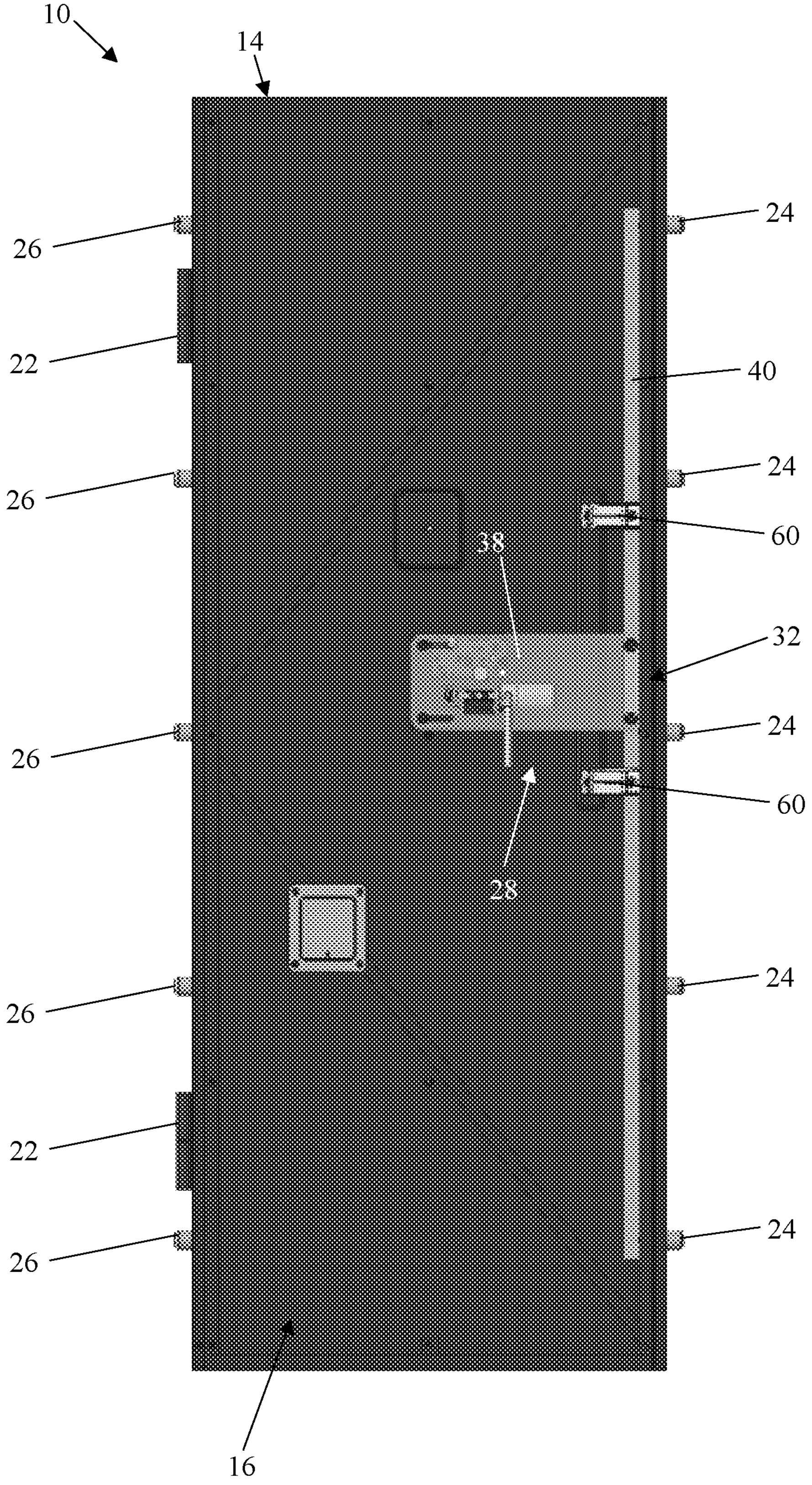
FIG. 3 is an elevation view of the vault door system with portions thereof hidden from view or shown transparent to reveal interior details.
Figure 4:
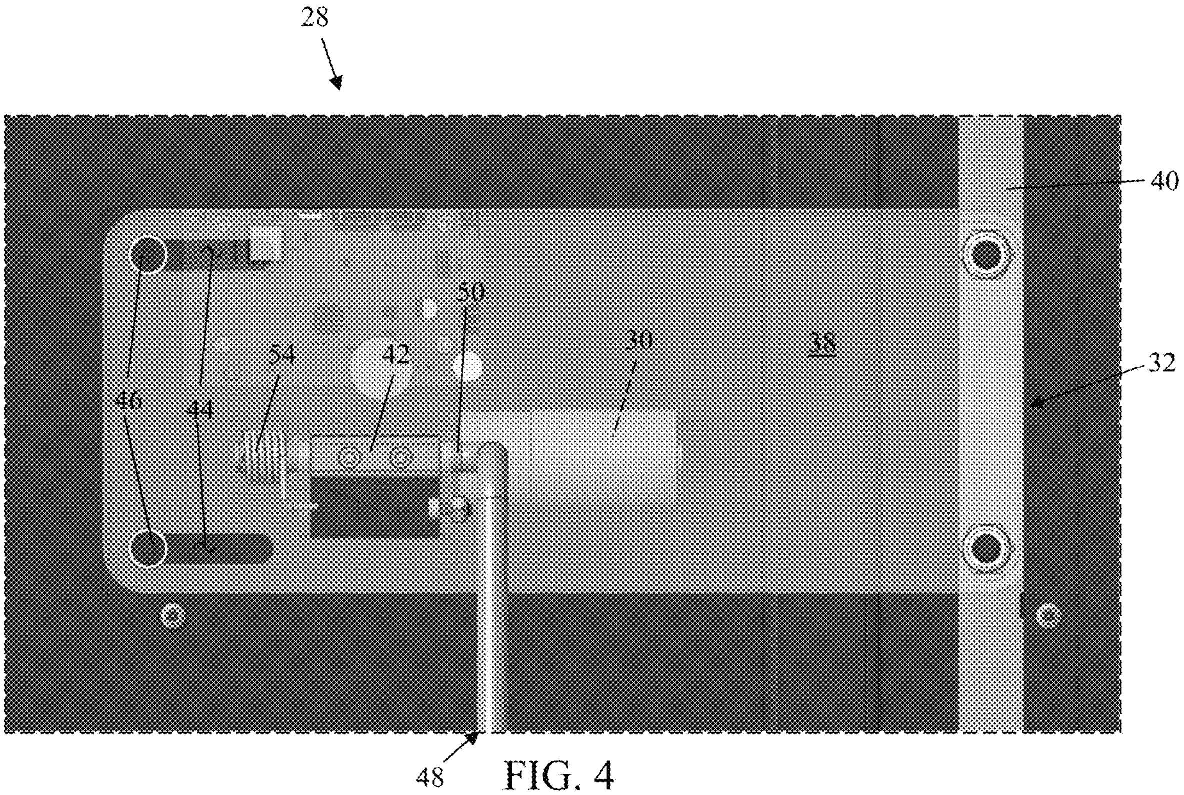
FIG. 4 is an elevation of a drive system of the vault door system, with portions of the vault door system hidden from view or shown transparent to reveal interior details.
Figure 5:
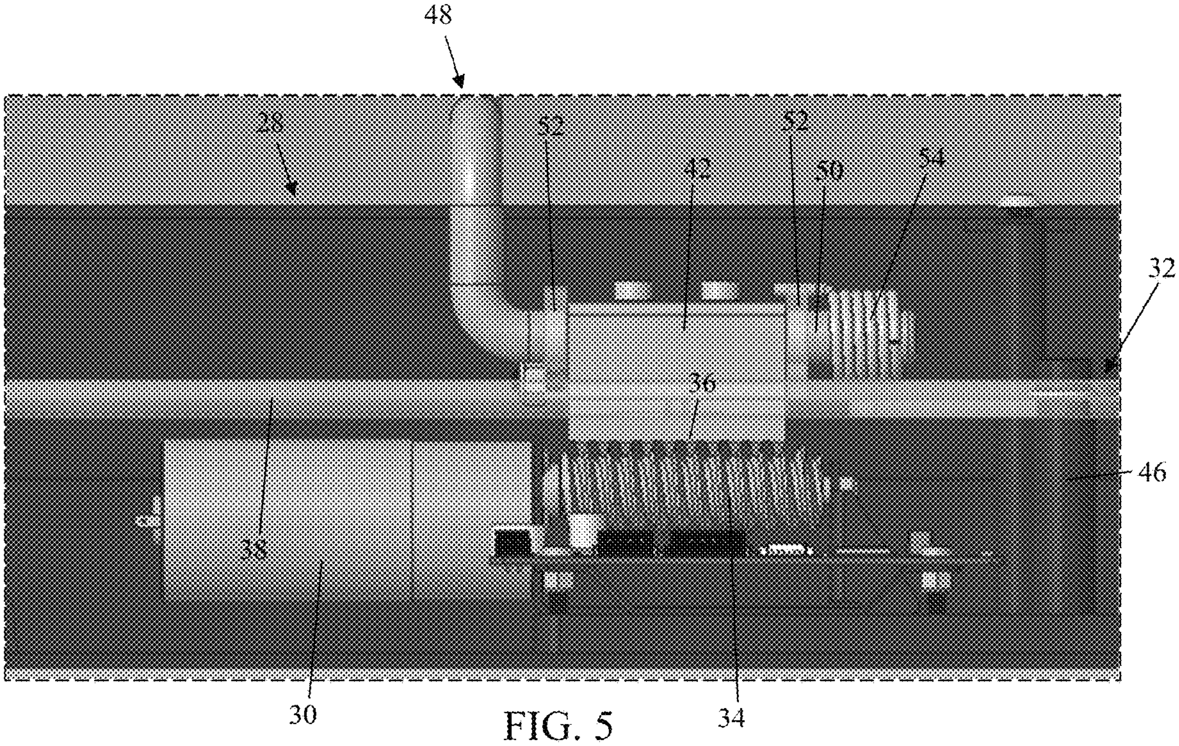
FIG. 5 is a top view of the drive system, with portions of the vault door system hidden from view or shown transparent to reveal interior details.

Referring to FIGS. 2 and 3, one embodiment of a vault door system for use in a safe or a vault of the present disclosure is generally indicated by reference numeral 10. The vault door system 10 or one or more aspects thereof can be used with generally any type or style of safe or vault, such as the vault 1 shown in FIG. 1. In one embodiment, the vault door system 10 is installed in a wall of a building to selectively permit ingress and egress for a vault room of the building. The vault door system 10 includes a frame 12 (such as the frame 3 of the vault 1 in FIG. 1) and a door 14. The frame 12 defines an opening that is selectively closeable by the door 14. The door 14 closes the opening in a closed position and permits access to the interior of the vault through the opening in an open position (e.g., does not block the opening). The door 14 has opposite interior and exterior sides 16, 18. The interior side 16 faces (e.g., is arranged to face) the interior of the vault. The interior side 16 includes an interior surface that faces the interior of the vault. The exterior side 18 obstructs intruders or unauthorized persons from entering the interior of the vault. The exterior side 18 includes an exterior surface 20 arranged to face away from the interior of the vault. One or more hinges 22 may connect the door 14 to the frame 12.

Figure 7:
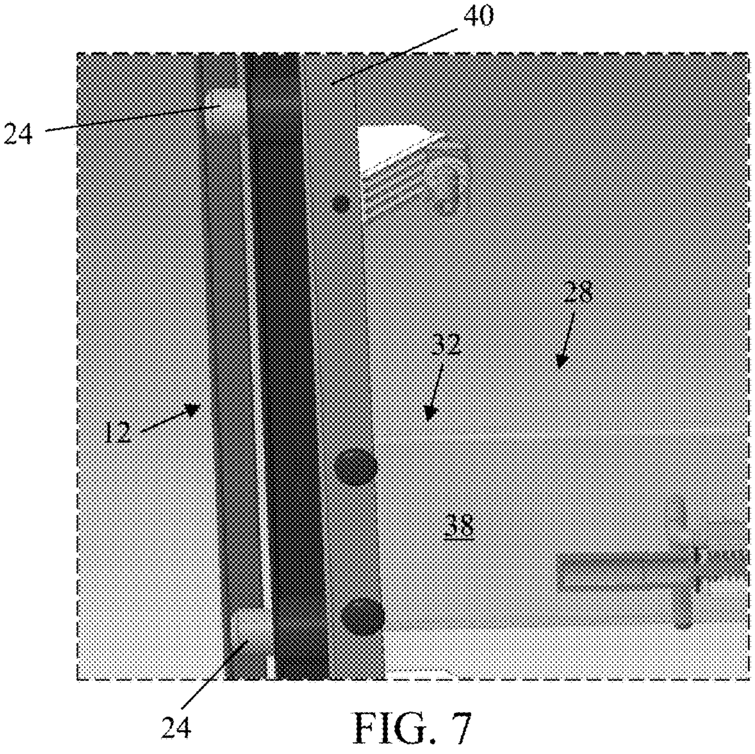
FIG. 7 is a perspective of a side of the vault door system engaged with a frame of the vault, with portions of the vault door system and vault hidden from view or shown transparent to reveal interior details.
Figure 8:
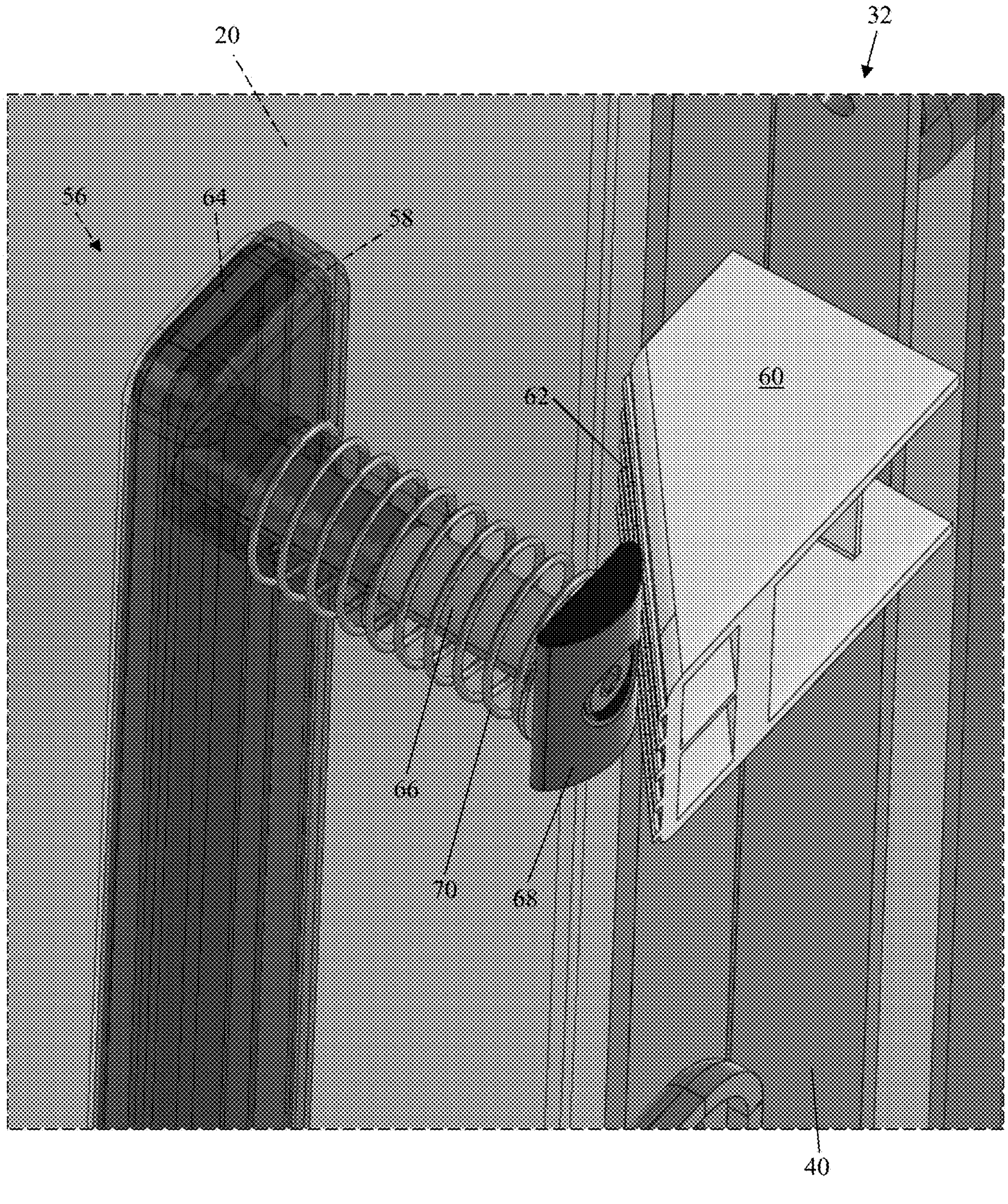
FIG. 8 is a rear perspective of an outer handle of the vault door system in a retracted position, with portions of the vault door system hidden from view or shown transparent to reveal interior details.
Figure 9:
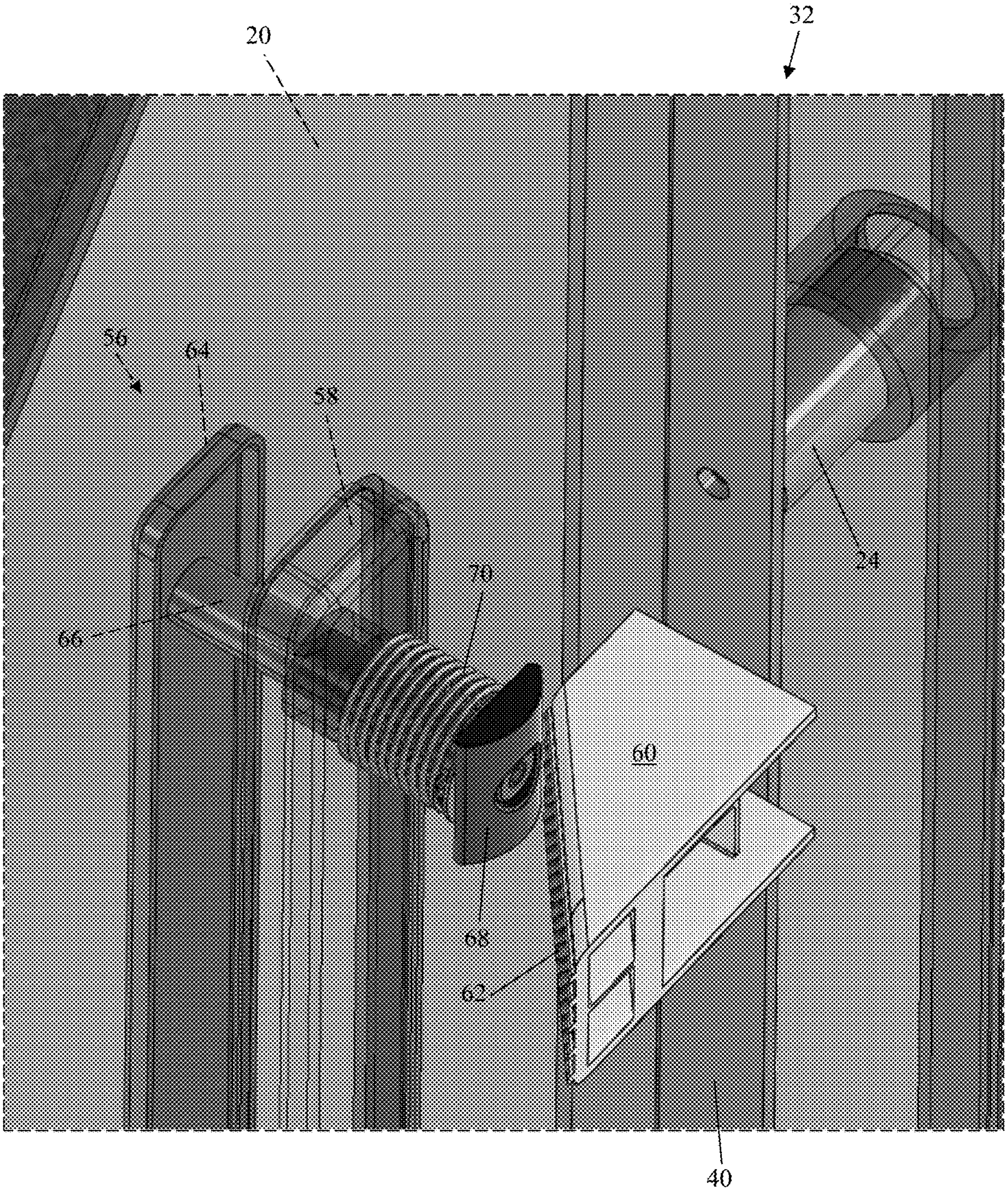
FIG. 9 is a rear perspective of the outer handle in an extended position, with portions of the vault door system hidden from view or shown transparent to reveal interior details.

The vault door system 10 includes a plurality of locking bolts 24 (broadly, at least one) supported by the door 14. In the illustrated embodiment, the vault door system 10 includes five locking bolts 24, although more or fewer locking bolts are within the scope of the present disclosure. The locking bolts 24 are generally disposed within openings in the door (FIG. 9). The locking bolts 24 are arranged along a perimeter of the door 14, such as along a side edge margin thereof as illustrated. In other embodiments, the locking bolts may be arranged along other edges (e.g., top, bottom, left side, right side) of the door. The locking bolts 24 are movable between a locked position (FIGS. 3, 7 and 10) and an unlocked position (FIG. 9). In the locked position, the locking bolts 24 protrude from the door 14 so that the locking bolts are positioned to engage the frame 12 (FIG. 7) of the vault to lock the door in the closed position. As shown in FIG. 7, when the door 14 is in closed position and the locking bolts 24 are in the locked position, the locking bolts engage the frame to inhibit the door 14 from being moved to the open position. In the unlocked position, the locking bolts 24 are generally retracted into the door 14 so that the locking bolts are positioned to disengage the frame 12 to permit the door to be moved to the open position. The locking bolts 24 may be completely retracted within the door 14 in the unlocked position, or otherwise retracted into the door a sufficient distance such that the locking bolts are clear of the restraining geometry of the frame 12 in the unlocked position. Once the frame geometry is no longer obstructing the locking bolts 24, the door 14 is free to swing about the hinges 22. In the illustrated embodiment, the vault door system 10 also includes a plurality of fixed bolts 26 supported by the door 14. The fixed bolts 26 are mounted on the hinge side or edge margin of the door 14 and do not move. Accordingly, the fixed bolts 26 are always protruding from the door 14. Rotating the door 14 about the hinges 22 moves the fixed bolts 26 into engagement and disengagement with the frame 12.

Referring to FIGS. 3-7, the vault door system 10 includes a drive system 28. The drive system 28 is configured to move the locking bolts 24 between the locked and unlocked positions. The drive system 28 includes a prime mover 30 (e.g., electric motor) configured to move the locking bolts between the locked and unlocked positions. In the illustrated embodiment, the prime mover 30 comprises an electric motor, although other configurations of the prime mover are within the scope of the present disclosure. For example, the prime mover may be a hand crank or wheel that is manually turned by a user. The drive system 28 also includes a drive train 32. Generally, the drive train 32 operatively couples the prime mover 30 to the locking bolts 24. That is, the prime mover 30 actuates or drives movement of the drive train 32 (broadly, "linkage") which in turn moves the locking bolts 24 between the locked and unlocked positions.

The drive train 32 includes a worm gear 34 configured to be rotated by the prime mover 30. In the illustrated embodiment, the worm gear 34 is mounted on an output shaft (not shown) of the prime mover 30. The drive train 32 includes a rack 36 (e.g., a gear rack). Generally, the rack 36 is in meshed engagement with the worm gear 34. As a result, rotation of the worm gear 34 by the prime mover 30 results in movement (e.g., linear movement) of the rack 36. The drive train 32 also includes a lock plate 38 (broadly, "link") and a bolt carrier 40. The bolt carrier 40 is attached to the locking bolts 24. For example, each locking bolt 24 may be attached to the bolt carrier 40 with a fastener (e.g., bolt, screw, etc.). The lock plate 38 is operatively coupled to the locking bolts 24. The lock plate 38 is connected to the bolt carrier 40. For example, the lock plate 38 may be attached to the bolt carrier 40 with one or more fasteners. Accordingly, the lock plate 38, bolt carrier 40, and locking pins 24 are fixed together such that movement of the lock plate results in corresponding movement of the bolt carrier and locking pins. The lock plate 38 is also operatively coupled to the prime mover 30. Specifically, the lock plate 38 is operatively coupled to the rack 36 such that rotation of the worm gear 34 (by the prime mover 30) moves (e.g., linearly moves) the lock plate (and thereby the locking pins 24). The lock plate 38 supports the rack 36. In the illustrated embodiment, the rack 36 is part of a lock block 42. The lock block 42 is mounted on the lock plate 38. When locking/unlocking the door 14 with the frame 12, the prime mover 30 rotates the worm gear 34 which interacts with the rack 36, converting rotational motion into linear or lateral motion of the rack. This linear movement of the rack 36 (broadly, the lock bock 42) causes linear movement of the lock plate 38, and thus linear movement of the bolt carrier 40 and locking bolts 24, thereby moving the locking bolts between the locked and unlocked positions. Moreover, the worm gear 34 generally restricts linear motion of the rack 36 (and therefore the lock plate 38, the bolt carrier 40 and the locking bolts 24), inhibiting unintentional movement of the locking bolts between the locked and unlocked positions. In the illustrated embodiment, the lock plate 38 defines one or more channels or slots 44. A guide or pin 46 of the door 14 is disposed in each slot 44 to guide the linear movement of the lock plate 38.

The vault door system 10 includes an inner handle 48. The inner handle 48 is supported by the door 14. The inner handle 48 is at the inner side 16 of the door 14 and is arranged to be accessible from the interior of the vault. The inner handle 48 is configured to allow a user to move the locking pins 24 between the locked and unlocked positions from within the interior of the vault. For example, if the door 14 should become locked while a person is inside the interior of the vault, the person can use the inner handle 48 to unlock the door (e.g., move the locking pins 24 to the unlocked position) and open the door. To move the locking pins 24 between the locked and unlocked positions, the inner handle 48 is configured to operatively disconnect the prime mover 30 (specifically, the worm gear 34) from the locking pins. The inner handle 48 is operatively coupled to the drive train 28 (broadly, the inner handle is part of the drive train). Specifically, the inner handle 48 is operatively coupled to the rack 36 (broadly, the lock block 42). The inner handle 48 includes a shaft 50. The lock block 42 (e.g., the rack 36) is mounted on the shaft 50 and rotates with the shaft. The shaft 50 extends through and can rotate relative to mounts 52 of the lock plate 38.

The inner handle 48 is moveable (e.g., pivotable) between a default position (FIGS. 4-6) and an override position (not shown). The shaft 50 allows a user to pivot or turn the inner handle 48 between default and override positions, which can be referred to as first and second positions, engaged and disengaged positions, or locked and unlocked positions. In the default position, the drive train 28 operatively couples the prime mover 30 to the locking bolts 24 so that the prime mover can move the locking bolts between the locked and unlocked positions. Specially, in the default position, the rack 36 is in meshed engagement with the worm gear 34. The inner handle 48 (e.g., shaft 50) is positioned such that the lock block 42 engages the worm gear 34. With the lock block 42 engaged with the worm gear 34, the lock plate 38 is operatively coupled to the prime mover 30. As mentioned above, the lock plate 38 is operatively coupled to the rack 36 (broadly, the lock block 42) such that rotation of the worm gear 34 linearly moves the lock plate when the inner handle 48 is in the default position. As the lock block 42 is moved by the worm gear 34, the lock block 42 engages one of the mounts 52 of the lock plate 38, thereby pushing the lock plate in a linear direction to move the locking pins 24 between the locked and unlocked positions.

In the override position, the drive train 38 does not operatively couple the prime mover 30 to the locking bolts 24. Specifically, in the override position, the rack 36 is disengaged with the worm gear 34. The inner handle 48 (e.g., shaft 50) is positioned such that the lock block 42 does not engage the worm gear. With the lock block 42 clear of the worm gear 34, the lock plate 38 is free to be manually moved via the inner handle 48 to move the locking pins 24 between the locked and unlocked positions. The inner handle 48 is operatively coupled to the locking bolts 24 so that the inner handle can move the locking bolts between the locked and unlocked positions. Specifically, the inner handle 48 is supported by the lock plate 38 (e.g., the mounts 52 thereof). For instance, the user can slide the inner handle 48 in one direction to move the locking pins 48 toward the locked position and slide the inner handle in the opposite direction to move the locking pins toward the unlocked position. Because the rack 36 is disengaged with the worm gear 34 when the inner handle 48 is in the override position, the inner handle is free to move the locking bolts 24 between the locked and unlocked positions when in the override position. However, because the rack 36 is engaged with the worm gear 34 when the inner handle 48 is in the default position, the inner handle is inhibited from moving the locking bolts 24 between the locked and unlocked positions when in the default position.

Figure 6:
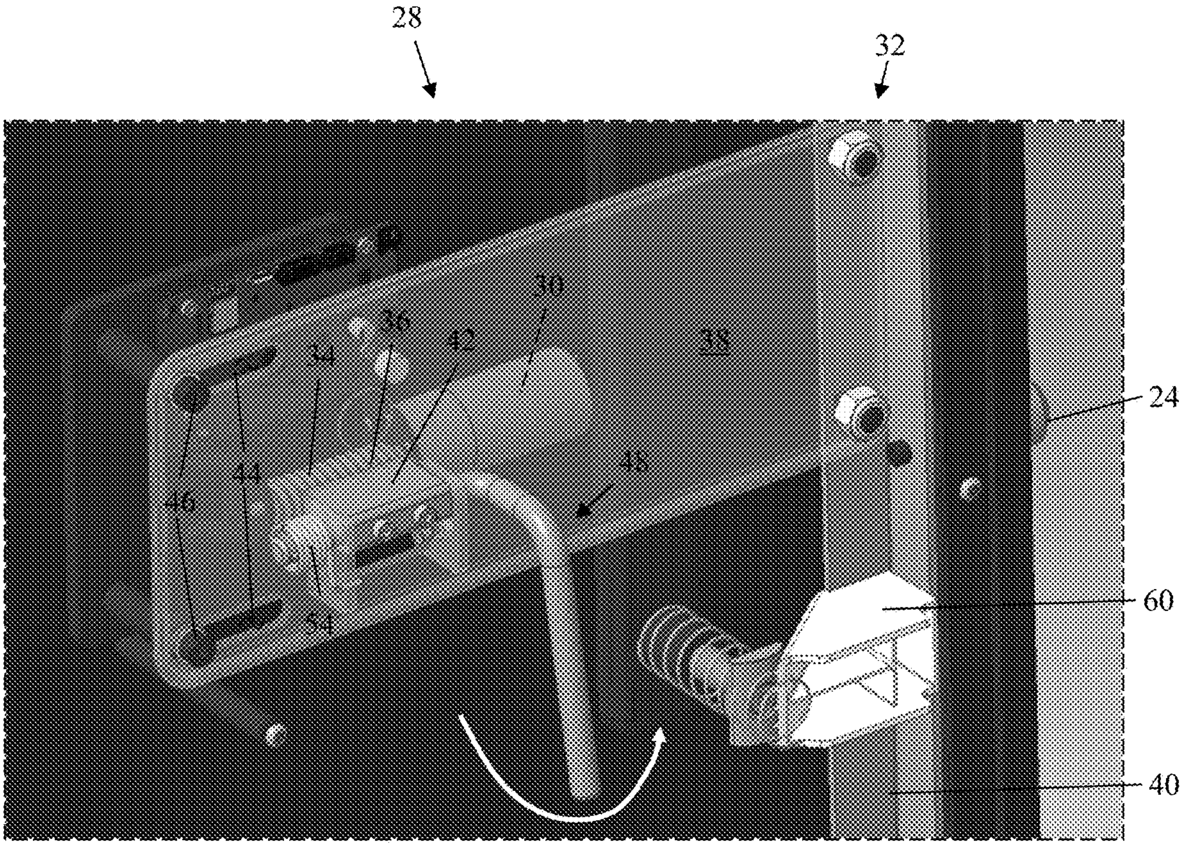
FIG. 6 is a perspective of the drive system, with portions of the vault door system hidden from view or shown transparent to reveal interior details.

The inner handle 48 pivots (e.g., rotates) between the locked and unlocked positions. As the inner handle 48 pivots between the locked and unlocked positions, the inner handle rotates the rack 36 (broadly, the lock block 42). This moves the rack 36 into and out of engagement with the worm gear 34. In the illustrated embodiment, the inner handle 48 is configured to be pivoted generally upward (as indicated in FIG. 6) to disengage the lock block 42 from the worm gear 34. With the lock block 42 disengaged from the worm gear 34, the user can move (e.g., slide) the lock plate 38 freely, relative to the worm gear, to the left or right to move the locking bolts 24 between the locked and unlocked positions. As is readily apparent, movement of the inner handle 48 conjointly moves the lock block 42, the lock plate 38, the bolt carrier 40 and the locking bolts 24. Accordingly, positioning the inner handle 48 in the override position allows the locking pins 24 to be operated manually (e.g., manual locking and unlocking of the door), in order to manual open the door 14. Desirably, the inner handle 48 (and by extension the rack 36) is automatically returned to the default position when the inner handle is release by the user, thereby reengaging the worm gear 34 with the rack 36. For example, in the illustrated embodiment, the inner handle 48 is biased toward the default position. The vault door system 10 includes a spring 54 biasing the inner handle 48 toward the default position. In the illustrated embodiment, the spring 54 comprises a torsion spring. The torsion spring is wrapped around the shaft 50 of the inner handle 38 with one engage engaging the lock plate 38 and the other end engaging the shaft. The spring 54 applies a constant biasing force on the inner handle 48, and thereby the lock block 42, to return the inner handle to the default position (e.g., to return the rack 36 of the lock block 42 back into engagement with the worm gear 54) when the user is not holding the inner handle in the override position (broadly, not pivoting the inner handle away from the default position).

Referring to FIGS. 2 and 8-10, the vault door system 10 includes an outer handle 56. The outer handle 56 is supported by the door 14. The outer handle 56 is at the outer side 18 of the door 14. The outer handle 56 is configured to allow a user to move the door 14 from the exterior of the door. The outer handle 56 is configured to generally only be used when the user needs to pull the door to rotate the door in one direction about the hinges 22 (either toward the open position or toward the closed position). If the door 14 opens into the vault, as shown in FIG. 2, the outer handle 56 is used to move the door to the closed position when the door is in the open position. If the door 14 opens out of the vault, similar to what is shown in FIG. 1, the outer handle 56 is used to move the door to the open position when the door is in the closed position. To move the door 14 in the opposite direction, the user can simply push against the exterior surface 20 of the door (either toward the closed position or toward the open position), and does not need to use the outer handle 56.

Figure 10:
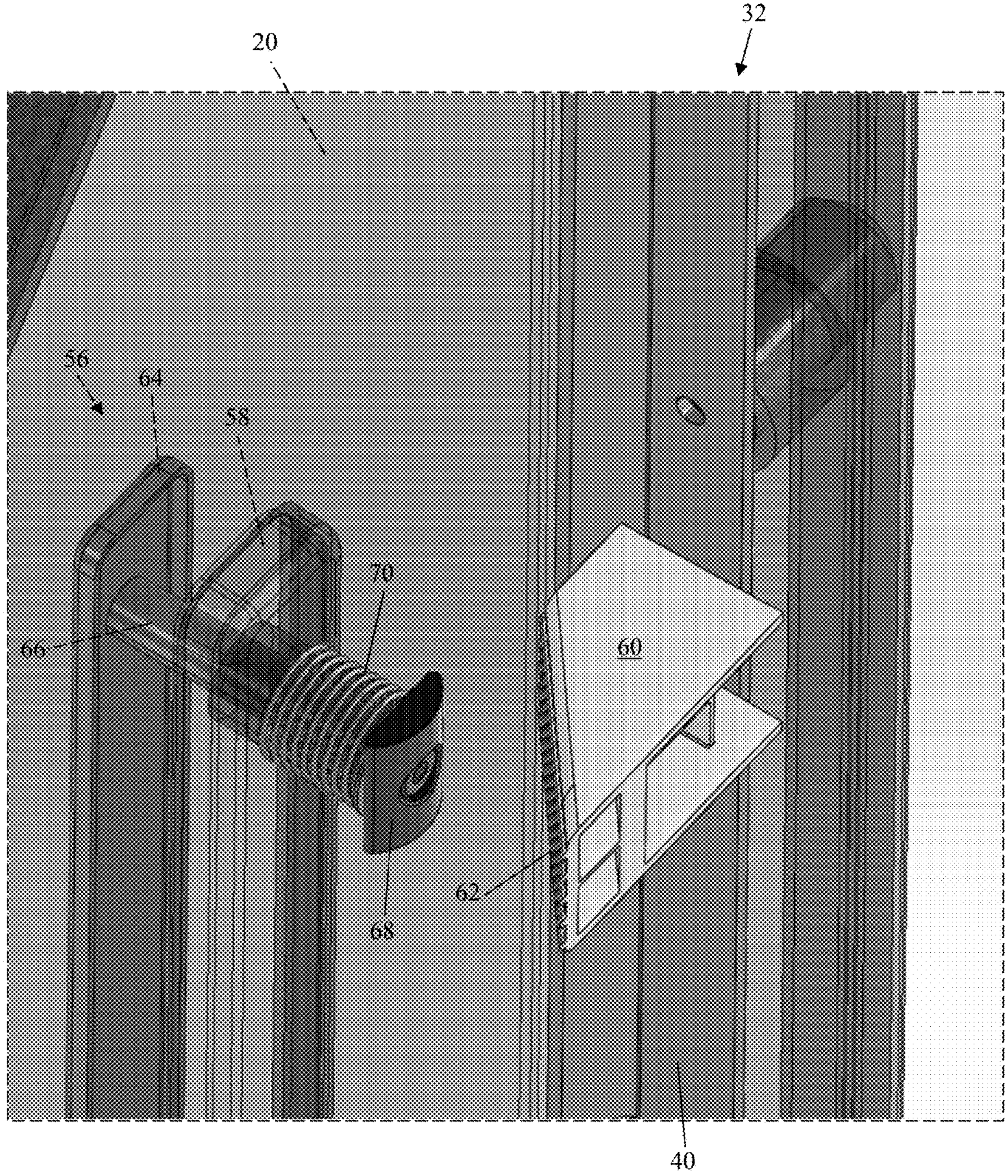
FIG. 10 is another rear perspective of the outer handle in an extended position, with portions of the vault door system hidden from view or shown transparent to reveal interior details.

The outer handle 56 is movable between a retracted position (FIG. 8) and an extended position (FIGS. 2, 9 and 10). The door 14 (e.g., the exterior side 18 thereof) defines a handle recess 58 sized and shaped to receive the outer handle 56 (e.g., at least a portion thereof). Desirably, the handle recess 58 closely conforms to the size and shape of the outer handle 56. The handle recess 58 extends generally inwardly from the exterior surface 20 of the door 14. In the retracted position, the outer handle 56 is arranged with respect to the door 14 to obstruct a user from gripping the outer handle to move the door via the outer handle. The outer handle 56 is flush with or retracted (e.g., recessed) into the door 14. Specifically, the outer handle 56 is disposed within the handle recess 58. The front or exterior end of the outer handle 56 is either flush with the exterior surface 20 of the door 14 or is recessed inwardly from the exterior surface of the door. Accordingly, a person is not able to grab the outer handle 56 when the outer handle is in the retracted position. This prevent unauthorized persons from accessing the outer handle 56 and moving the door 14 toward the open or closed positions. In the extended position, the outer handle 56 (e.g., at least a portion thereof) is disposed outward or in front of the exterior surface 20 of the door 14 such that the outer handle can be grabbed by a user. This allows the user to pull the outer handle 56 and move the door 14 toward the open or closed position.

The drive system 28 is configured to move the outer handle 56 toward the extended position from the retracted position. The drive train 32 operatively couples the prime mover 30 to the outer handle 56. Specifically, the drive train 32 is operatively coupled to the outer handle 56. The prime mover 30 is configured to move the outer handle toward the extended position. In the illustrated embodiment, the drive train 32 is operatively coupled to the locking bolts 24 and the outer handle 56 such that the prime mover 30 is moves the locking bolts toward the unlocked position and the outer handle toward the extended position simultaneously. The drive train 32 includes two cams 60 (broadly, at least one cam). The cams 60 are configured to engage the outer handle 56 to move the outer handle toward the extended position (from the retracted position). Specifically, the cams 60 push the outer handle 56 in an outward direction, toward the extended position. The cams 60 are attached to (e.g., mounted on) the bolt carrier 40. For example, each cam 60 may be attached to the bolt carrier 40 with a fastener (e.g., bolt, screw, etc.). Accordingly, the cams 60 and bolt carrier 40 are fixed together such that the movement of the lock plate 38 results in corresponding movement of the cams 60. Each cam 60 includes a ramp or cam surface 62 that engages the outer handle 56. each cam surface 62 is generally planar is an is oriented at an angle, such as about 45 degrees, relative to the direction of movement of the cams 60.

In the illustrated embodiment, the outer handle 56 includes a handle bar 64. The handle bar 64 is configured to be gripped or grabbed by the user to move the door 14, when the outer handle 56 is in the extended position. The handle bar 64 is disposed in the handle recess 58 when the outer handle 56 is in the retracted position and is disposed outward of the exterior surface 20 of the door 14 when the outer handle is in the extended position. In the retracted position, the handle bar 64 is flush with or recessed with respect to the exterior surface 20 of the door 14. In the extended position, the handle bar 64 is spaced from the exterior surface 20 (e.g., a plane defined thereby) such that the user can insert their fingers around the rear of the handle bar to grip and pull the handle bar. The outer handle 56 also includes two protrusions or shafts 66 (broadly, at least one protrusion or shaft) extending from the handle bar 64. The protrusions 66 extend into the door 14 (e.g., into openings defined thereby). The door 14 supports the protrusions 66 and the protrusions are free to move (e.g., slide) within their openings relative to the door. The protrusions 66 are generally disposed adjacent each end of the handle bar 64. Mounted on the end of each protrusion 66 (e.g., the end opposite the handle bar 64) is a cam cap 68. Each cam cap 68 is attached to its corresponding protrusion, such as with a fastener (e.g., bolt, screw, etc.). Each cam cap 68 is arranged to be engaged by one of the cams 60. Each cam cap 68 has an arcuate surface that engages the cam surface 62 of the corresponding cam 60.

In the illustrated embodiment, the outer handle 56 is biased toward the retracted position. The vault door system 10 includes two springs 70 (broadly, at least one spring) biasing the outer handle 56 toward the retracted position. Each spring 70 comprises a compression spring. Each spring 70 generally extends around one of the protrusions 66 with one end engaging the door 14 and the other end engaging the outer handle 56 (specifically, one of the cam caps 68).

In operation, when the locking bolts 24 are in the locked position (e.g., the bolt carrier 40 is in a locked position), the outer handle 56 is retracted into the handle recess 58. The springs 70 apply a constant biasing force on the outer handle 56 (in the inward direction), to move (e.g., retract) the outer handle toward the retracted position and hold the outer handle in the retraced position. In the retracted position, the handle bar 54 is received in the exterior surface 20 of the door 14 (e.g., flush with or recessed inboard of the exterior surface) such that the handle bar is not readily available to an unauthorized person or intruder trying to open the door improperly. To move the outer handle 56 to the extending position, the prime mover 30 slides the bolt carrier 40 (as described above), and therefore the cams 60 mounted thereon. As the bolt carrier 40 and cams 60 are moved to their respective unlocked positions, the outer handle 56 is force outward to the extended position (FIG. 9). The cams 60 engage and push the cam caps 68 to move the outer handle 56 toward the extend position. The cam caps 68 (broadly, "cam followers") ride on the ramp surfaces of the cams 60. Thus, the outer handle 56 automatically extends outward to the extended position when the door 14 is unlocked (e.g., the locking bolts 24 are moved to the unlocked position). In the extended position, the outer handle 56 is extended outward from the exterior surface 20 of the door 14 so a user can grab the outer handle by extending a portion of their hand (e.g., fingers) behind the handle bar 64. This facilitates the user pulling the door forward to either the closed position from a rearward open position or the open position from a rearward closed position.

The outer handle 56 allows the door 14 to lock even if the handle continues to be held by a user (e.g., the user overcomes the biasing forces of the spring 70 and keeps the outer handle in the extended position). For example, the user may continue to pull the door 14 forward against the frame 12 to keep the door in the closed position as the locking bolts 24 are moved to the locked position to lock the door. Upon pulling the door 14 closed with the outer handle 56, the locking bolts 24 are allowed to travel back into the locked position without interference due to the user continuing to hold the outer handle in the extended position. In other words, the user continuing to hold the outer handle 56 in the extended position does not interfere with movement of the cams 60 (and therefore the bolt carrier 40 and locking bolts 24). This allows the user to keep the door 14 pulled firmly closed using the outer handle 56, while the vault door system 10 is locked. The user can release the outer handle 56 at any time (after the outer handle has been grabbed by the user in the extended position), permitting the springs 70 to return the outer handle to the retracted position. Thus, the outer handle 56 automatically retracts or returns to the retracted position when released by a user, such as after the door 14 is locked. The outer handle is now once again unavailable for an unauthorized person to grab and try to open the door 14 without properly unlocking the door.

Figure 11:
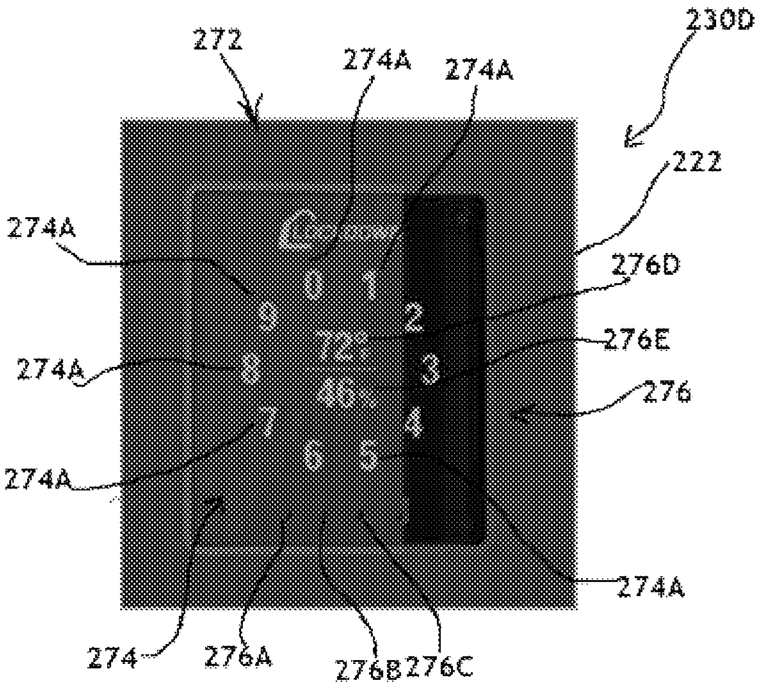
FIG. 11 is a front elevation of a user interface of the vault door system.
Figure 12:
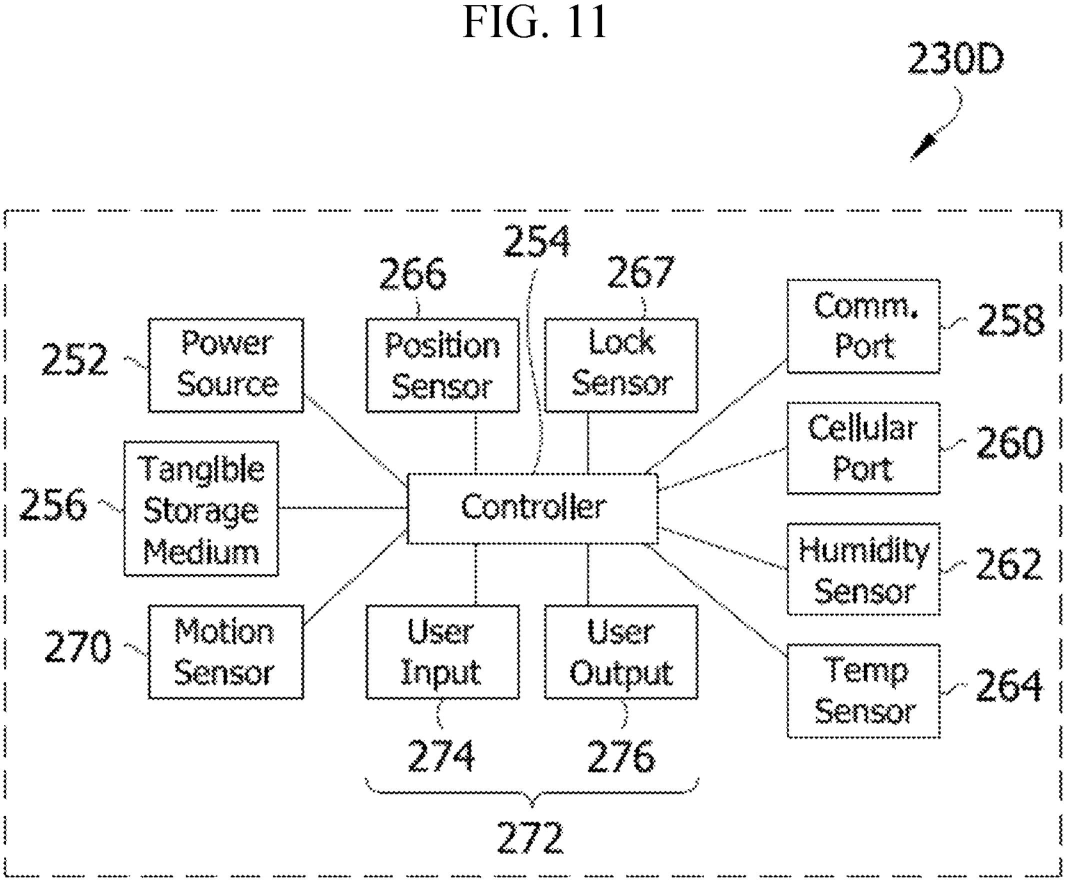
FIG. 12 is a schematic of a control system of the vault door system.

Referring to FIGS. 11 and 12, the vault door system 10 may include a control system 230D for controlling the operation of the vault door system 10 (e.g., the prime mover 30). The control system 230D includes a controller 254 (broadly, a computer) for controlling the operation of the vault door system 10. The controller 254 (e.g., a vault door controller) controls and/or is in communication with different components of the vault door system 10. The controller 254 comprises a CPU or processor (e.g., a vault door processor). A RAM or memory 256 (broadly, non-transitory computer-readable storage medium) is communicatively coupled to the processor. Generally, the controller 254 controls and operates the various components (e.g., prime mover 30) of the vault door system 10. Broadly, the memory 256 includes (e.g., stores) processor-executable instructions for controlling the operation of the vault door system 10 and the components thereof. The instructions embody one or more functional aspects of the vault door system 10 and the components thereof, as described herein, with the processor executing the instructions to perform said one or more functional aspects. The components of the vault system 10 may be in wired or wireless communication with the controller 254. Other configurations of the control system 23D are within the scope of the present disclosure.

The control system 230D includes a user interface 272. The user interface 272 is disposed on the exterior surface 20 of the door 14, so that the user interface is accessible from outside the vault. The user interface 272 can be used to unlock the door 14. The user interface 272 has user input 274 and a display 276. The user input includes a plurality of actuators (e.g., buttons) including a plurality of number buttons 274A, such as to enter a code for unlocking the door 24. The number buttons 274A are arranged in a circular pattern extending around indicators 276D, 276E, which display properties of the vault door system 10. In the illustrated embodiment, the indicators 276D, 276E display current temperature and humidity conditions sensed by integrated temperature sensor 264 and humidity sensor 262. The temperature sensor 264 and the humidity sensor 262 are arranged to sense the conditions within the interior of the vault. Thus, the user interface 272 (e.g., display 276 thereof) allows a user to know what the conditions of the interior of the vault are like when the door 14 is closed. The display 276 may also include a plurality of other indicators, such as a Wi-Fi connection indicator 276A, a lower battery indicator 276B, and a warning indicator 276C.

The control system 230D can include a lock sensor 267 onboard the door 14 and is connected to the controller 254 to provide a signal of whether the door is locked or unlocked. For example, the lock sensor 267 may be a position sensor arranged to detect location of the locking bolts 24, the bolt carrier 40, the lock plate 38, etc. The control system 230D may also include a position sensor 266 to detect whether the door is opened or closed. In one embodiment, the position sensor 266 is a hall effect sensor configured to detect the location of the door 14 relative to a magnet 265 on the frame 12 (FIG. 2). In one embodiment, the controller 254 may automatically lock the door 14 (e.g., move the locking pins 24 to the locked position) when the position sensor 266 detects the door is in the closed position. The control system 230D may also include a current sensor that provides a current signal to the controller 254 to indicate current draw of the vault door system 10 (e.g., of the prime mover 30) during door 14 operation. The control system 230D may also include a motion sensor 270, such as an accelerometer, to provide a motion signal to the controller 254 to detect motion of the door 14. The controller 254 can detect faults associated with door 14 operation and indicate such faults via the warning indicator 276C. For example, if the controller 254 detects current draw via the current sensor out of range when the door 14 is locked or unlocked (e.g., when the locking pins 24 are moved between the locked and unlocked positions), or if the controller detects time to lock/unlock the door is out of range, warning indicator 276C may be energized. This provides a warning of potential upcoming failure or indicator of actual failure such that the vault door system 10 can be fixed.

In one embodiment, the vault door system 10 provides a leveling indication to assist with plumb installation of the vault door system. The motion sensor 270 can also be used to detect the degree of upright orientation of the door 14 to assist with the installation of the vault door system 10. When the vault door system 10 is positioned at a wall opening for installing the frame 12 in the wall opening, the user interface 272 can be adjusted or changed to an installation mode or a plumb mode. The motion sensor 270 detects the vertical orientation of the vault door system 10 (e.g., the door 14 and the frame 12) in the exterior-interior direction (e.g., forward-rearward direction) and the side-to-side direction (e.g., left-right direction). Indication of vertical plumb can be provided by the user interface 272 or via a smart device connected to the control system 230D, via the communication port 258 and/or cellular port 260. For example, the communication port 258 can be a Wi-Fi communication port such that the smart device is connected via Wi-Fi. To indicate the plumbness of the vault door system 10, the exterior-interior attitude can be indicated in degrees relative to the vertical (e.g., E 5 degrees or I 11 degrees) in the location of the temperature indicator 276D. Side-to-side attitude can be indicated in degrees relative to the vertical (e.g., L 2 degrees or R 6 degrees) in the location of the humidity indicator 276E. As the vault door system 10 is tiled to approach vertical, the attitude numbers approach zero and show zero when vertical. In another embodiment, to indicate the plumbness of the vault door system 10, the number indicators 274A of number buttons are illuminated based on the attitude of the vault door system. For example, when tilted severely forward and right, only indicator number 4 or 5 is illuminated. As the door is tilted to approach plumb, indicator numbers 3, 4, 5 and 6 are illuminated. When the door is fully plumb or vertical, all the number indicators 274A are illuminated. In another embodiment, the smart device connected to the control system 230D via the communication port 258. An application on the smart device displays the attitude of the vault door system 10 relative to the vertical to assist the user in orienting the vault door system to achieve vertical plumb. In these embodiments, the attitude indications are provided in real time so the installer can reference the indicators to know whether to move/tilt the vault door system 10 in a particular direction to achieve vertical plumb.

The frame 12 of the vault door system 10 may include inner and outer electrical power ports for powering the components of the vault door system, such as the controller 254 and the prime mover 30. For example, a first electrical power port may be provided at the lower, front side of the frame 12 and a second electrical power port may be provided at the lower, rear side of the frame. The vault door system 10 may be connected to AC and/or DC power. For example, the vault door system 10 can include an AC power cord with an electrical outlet plug that can be used for connecting electrical power to the first or second electrical power ports. Alternatively, or in addition to, a DC power cord including first and second electrical contacts can be connected to terminals of a large capacity DC power source (e.g., a battery, a DC power inverter, solar panels, etc.) and connected to the first or second electrical power ports. The vault door system 10 may include an internal battery backup. Internal batteries mounted in the door 14 can be automatically charged when connected to power at the first or second electrical power ports. When a loss of power is detected (such as during a grid failure such that the first and second electrical power ports are not receiving power), the controller 254 can automatically change over to the internal battery power source. This modular power source allows AC and/or DC power to be connected to run the vault door system 10 uninterrupted and to have an internal battery backup in the event of a power loss.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

It will be apparent that modifications and variations are possible without departing from the scope defined in the appended claims.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A vault door system for use in a vault, the vault door system comprising:

- a door having opposite inward and exterior sides, the inward side arranged to face an interior of the vault when the door is closed;
- a plurality of locking bolts supported by the door, the locking bolts being movable between a locked position and an unlocked position, wherein in the locked position the locking bolts protrude from the door so that the locking bolts are positioned to engage a frame of the vault to lock the door in a closed position and wherein in the unlocked position the locking bolts are retracted relative to the locked position so that the locking bolts are positioned to disengage the frame to permit the door to be moved to an open position;
- a drive system including a prime mover and a drive train, the prime mover configured to actuate the drive train to move the locking bolts from the locked position toward the unlocked position and from the unlocked position toward the locked position, the drive train including a link operatively coupled to the locking bolts and moveable with the locking bolts as the locking bolts move between the locked and unlocked positions; and
- an inner handle at the inward side of the door and arranged to be accessible from the interior of the vault, the inner handle extending inward away from the exterior side of the door to a location inward with respect to the link to define a space between the link and a handle portion of the inner handle, the space sized to accommodate a hand of a user when the hand grasps the handle portion of the inner handle, the inner handle being operatively coupled to the drive train and being movable between a first position and a second position, wherein in the first position the drive train operatively couples the prime mover to the plurality of locking bolts so that the prime mover can move the locking bolts between the locked and unlocked positions and wherein in the second position the drive train does not operatively couple the prime mover to the plurality of locking bolts, the inner handle being operatively coupled to the plurality of locking bolts such that the inner handle moves in a linear direction as the locking bolts are moved between the locked and unlocked positions, regardless of whether the inner handle is in the first or second position.

2. The vault door system of claim 1, wherein the inner handle is operatively coupled to the plurality of locking bolts so that the inner handle can move the locking bolts between the locked and unlocked positions.

3. The vault door system of claim 2, wherein the inner handle is free to move the locking bolts between the locked and unlocked positions in the second position and is inhibited from moving the locking bolts between the locked and unlocked positions in the first position.

4. The vault door system of claim 1, wherein the drive train includes a worm gear configured to be rotated by the prime mover and a gear rack.

5. The vault door system of claim 4, wherein the gear rack is in meshed engagement with the worm gear when the inner handle is in the first position and is disengaged with the worm gear when the inner handle is in the second position.

6. The vault door system of claim 5, wherein the link is operatively coupled to the gear rack such that rotation of the worm gear linearly moves the link when the inner handle is in the first position.

7. The vault door system of claim 6, wherein the drive train includes a bolt carrier connected to the locking bolts, the link being connected to the bolt carrier.

8. The vault door system of claim 5, wherein the inner handle is configured to rotate the gear rack with respect to the worm gear as the inner handle moves between the first position and the second position.

9. The vault door system of claim 1, wherein the inner handle is biased toward the first position.

10. The vault door system of claim 9, further comprising a spring biasing the inner handle toward the first position.

11. The vault door system of claim 10, wherein the handle portion of the inner handle is located inward of the spring.

12. The vault door system of claim 10, wherein the space is inward of the spring.

13. The vault door system of claim 1, wherein the prime mover comprises an electric motor.

14. The vault door system of claim 1, wherein the space is defined inward of the link and outward of the handle portion of the inner handle.

15. The vault door system of claim 1, wherein the inner handle is pivotable with respect to the link between the first and second positions.

16. The vault door system of claim 1, wherein the handle portion of the inner handle is an elongate member.

17. The vault door system of claim 16, wherein the elongate member is a cylindrical shaft.

18. A vault door system for use in a vault, the vault door system comprising:

- a door having opposite inward and exterior sides, the inward side arranged to face an interior of the vault;
- a plurality of locking bolts supported by the door, the locking bolts being movable between a locked position and an unlocked position, wherein in the locked position the locking bolts protrude from the door so that the locking bolts are positioned to engage a frame of the vault to lock the door in a closed position and wherein in the unlocked position the locking bolts are retracted relative to the locked position so that the locking bolts are positioned to disengage the frame to permit the door to be moved to an open position;
- a drive system including a prime mover and a drive train, the prime mover configured to actuate the drive train to move the locking bolts from the locked position toward the unlocked position and from the unlocked position toward the locked position; and an inner handle at the inward side of the door and arranged to be accessible from the interior of the vault, the inner handle being operatively coupled to the drive train and being pivotable with respect to the door between a first position and a second position, wherein in the first position the drive train operatively couples the prime mover to the plurality of locking bolts so that the prime mover can move the locking bolts between the locked and unlocked positions and wherein in the second position the drive train does not operatively couple the prime mover to the plurality of locking bolts, the inner handle being movable in a linear direction.

19. The vault door system of claim 18, wherein the inner handle is operatively coupled to the drive train such that the drive train moves the inner handle in the linear direction.

20. The vault door system of claim 18, wherein the inner handle pivots between the first and second positions about an axis of rotation that is parallel to the linear direction.

21. The vault door system of claim 18, wherein the inner handle is movable in the linear direction when the inner handle is in the first position.

22. The vault door system of claim 18, wherein the inner handle is operatively coupled to the plurality of locking bolts so that the inner handle can move the locking bolts between the locked and unlocked positions as the inner handle moves in the linear direction.

23. The vault door system of claim 22, wherein the inner handle is free to move the locking bolts between the locked and unlocked positions in the second position and is inhibited from moving the locking bolts between the locked and unlocked positions in the first position.

24. A vault door system for use in a vault, the vault door system comprising:

a door having opposite inward and exterior sides, the inward side arranged to face an interior of the vault;

a plurality of locking bolts supported by the door, the locking bolts being movable between a locked position and an unlocked position, wherein in the locked position the locking bolts protrude from the door so that the locking bolts are positioned to engage a frame of the vault to lock the door in a closed position and wherein in the unlocked position the locking bolts are retracted relative to the locked position so that the locking bolts are positioned to disengage the frame to permit the door to be moved to an open position;

a drive system including a prime mover and a drive train, the prime mover configured to actuate the drive train to move the locking bolts from the locked position toward the unlocked position and from the unlocked position toward the locked position, the drive train including gear teeth being pivotable between an engaged position and a disengaged position; and an inner handle at the inward side of the door and arranged to be accessible from the interior of the vault, the inner handle being operatively coupled to the gear teeth and being movable between a first position and a second position, wherein in the first position the gear teeth are in the engaged position such that the drive train operatively couples the prime mover to the plurality of locking bolts so that the prime mover can move the locking bolts between the locked and unlocked positions and wherein in the second position the gear teeth are in the disengaged position such that the drive train does not operatively couple the prime mover to the plurality of locking bolts.

25. The vault door system of claim 24, wherein the drive train includes a gear configured to be rotated by the prime mover, wherein in the engaged position the gear teeth are in meshed engagement with the gear, and wherein in the disengaged position the gear teeth are disengaged with the gear.

26. The vault door system of claim 25, wherein the gear is a worm gear.

27. The vault door system of claim 25, wherein the inner handle is operatively coupled to the plurality of locking bolts so that the inner handle can move the locking bolts between the locked and unlocked positions.

28. The vault door system of claim 27, wherein the inner handle is free to move the locking bolts between the locked and unlocked positions in the second position and is inhibited from moving the locking bolts between the locked and unlocked positions in the first position.

29. The vault door system of claim 24, wherein the inner handle is pivotable between the first and second positions.

30. The vault door system of claim 29, wherein the gear is configured to rotate about an axis of rotation, and wherein the inner handle is pivotable about an axis parallel to the axis of rotation.

31. The vault door system of claim 29, wherein the gear teeth are configured to pivot between the engaged and disengaged positions as the inner handle pivots between the first and second positions.

32. A vault door system for use in a vault, the vault door system comprising:

a door having opposite inward and exterior sides, the inward side arranged to face an interior of the vault when the door is closed;

a plurality of locking bolts supported by the door, the locking bolts being movable between a locked position and an unlocked position, wherein in the locked position the locking bolts protrude from the door so that the locking bolts are positioned to engage a frame of the vault to lock the door in a closed position and wherein in the unlocked position the locking bolts are retracted relative to the locked position so that the locking bolts are positioned to disengage the frame to permit the door to be moved to an open position;

a drive system including a prime mover and a drive train, the prime mover configured to actuate the drive train to move the locking bolts from the locked position toward the unlocked position and from the unlocked position toward the locked position;

an inner handle at the inward side of the door and arranged to be accessible from the interior of the vault, the inner handle being operatively coupled to the drive train such that the drive train drives movement of the inner handle, the inner handle being movable between a first position and a second position, wherein in the first position the drive train operatively couples the prime mover to the plurality of locking bolts so that the prime mover can move the locking bolts between the locked and unlocked positions and wherein in the second position the drive train does not operatively couple the prime mover to the plurality of locking bolts, the inner handle being pivotable with respect to the door between the first and second positions; and a spring biasing the inner handle toward the first position, wherein the inner handle extends inward away from the exterior side of the door to a handle portion of the inner handle, the handle portion located inward with respect to the spring, the handle portion defining an inward end of a space sized to accommodate the hand of the user when the hand grasps the handle portion.

33. The vault door system of claim 32, wherein the inner handle is operatively coupled to the drive train such that the drive train drives linear movement of the inner handle.

34. The vault door system of claim 33, wherein the drive train is configured to drive linear movement of the inner handle when the inner handle is in the first position.

35. The vault door system of claim 34, wherein the drive train is configured such that the linear movement of the inner handle occurs simultaneously with the movement of the locking bolts between the locked and unlocked positions.

36. The vault door system of claim 35, wherein the inner handle is operatively coupled to the plurality of locking bolts so that the inner handle can move the locking bolts between the locked and unlocked positions.

37. The vault door system of claim 36, wherein the inner handle is free to move the locking bolts between the locked and unlocked positions in the second position and is inhibited from moving the locking bolts between the locked and unlocked positions in the first position.

38. The vault door system of claim 32, wherein the drive train includes a link operatively coupled to the locking bolts and moveable with the locking bolts as the locking bolts move between the locked and unlocked positions, the handle portion located inward with respect to the link.

39. The vault door system of claim 38, wherein the space is defined inward of the link and outward of the handle portion of the inner handle.

40. The vault door system of claim 32, wherein the drive train includes a link operatively coupled to the locking bolts and moveable with the locking bolts as the locking bolts move between the locked and unlocked positions, the inner handle being pivotable with respect to the link between the first and second positions.

41. The vault door system of claim 32, wherein the inner handle is pivotable with respect to the spring between the first and second positions.

42. The vault door system of claim 32, wherein the spring is coupled to a second portion of the inner handle, wherein the inner handle is an elongate member and includes at least one bend between the second portion and the handle portion.

43. The vault door system of claim 38, wherein the door has an edge and the locking bolts protrude from the edge of the door in the locked position, the inner handle being moveable with respect to the door between a first location and a second location to move the locking bolts, the inner handle being closer to the edge of the door in the first location than in the second location.

44. The vault door system of claim 32, wherein the spring is wrapped around a second portion of the inner handle.

* * * * *